Patented July 11, 1950

2,515,141

UNITED STATES PATENT OFFICE 2,515,141

REGENERATION OF CAUSTIC SOLUTIONS

John Borden Stripling, Beaumont, Tex., assignor to Socony-Vacuum Oil Company, Incorporated, New York, N. Y., a corporation of New York No Drawing. Application May 13, 1948, Serial No. 26,917

3 Claims. (Cl. 196—32)

The present invention relates to the regeneration of caustic solutions used to absorb hydrogen sulfide and $C_1$ to $C_3$ mercaptans from mixtures of hydrocarbons containing the aforesaid sulfhydryls and, more particularly, to the removal of organic lead compounds from mixtures of hydrocarbons sweetened by the sodium plumbite method and concurrent regeneration of fouled caustic solutions.

It has been recognized practice for many years to remove hydrogen sulfide from gases containing the same or from mixtures of liquid hydrocarbons containing hydrogen sulfide by absorbing the hydrogen sulfide in an aqueous solution of an alkali metal hydroxide, usually, for economic reasons, a solution of sodium hydroxide. When the low boiling mercaptans such as the $C_1$ to $C_3$ mercaptans are present in the gaseous or liquid mixture of hydrocarbons as well as hydrogen sulfide, both the hydrogen sulfide and to some extent the $C_1$ to $C_3$ mercaptans are extracted by the aqueous alkaline solution.

It is customary and conventional to use the aqueous alkaline solution to extract hydrogen sulfide from the gaseous or liquid mixture of hydrocarbons until the aqueous solution can no longer efficiently absorb hydrogen sulfide. The alkaline solution is then said to be spent and is discarded.

One of the most commonly employed methods of reducing the mercaptan content of mixtures of hydrocarbons containing mercaptans and/or thiophenols, such as petroleum oil distillate, is the "doctor" or sodium plumbite treatment. In the doctor treatment of mixtures of hydrocarbons containing alkyl and aryl sulfhydryls, such as gasoline, kerosene and the like, are usually treated with aqueous caustic soda to remove hydrogen sulfide and then treated with an alkaline solution of litharge until negative to the "doctor" test. Mixtures of hydrocarbons which are negative in the "doctor" test are said to be "sweet." These "sweet" mixtures of hydrocarbons are satisfactory from the standpoint of absence of an excessive amount of mercaptans or thiophenols, but often are unsatisfactory due to the presence of organic lead compounds either in suspension or solution which results in the formation of sediment containing lead.

It has now been discovered that this undesirable tendency of "doctor sweet" mixtures of hydrocarbons to deposit a sediment on standing can be eliminated and spent hydrogen sulfide scrubbing liquor can be regenerated. Accordingly, it is an object of the present invention to provide a means for removing lead from "doctor sweet" mixtures of hydrocarbons containing organic lead compounds. It is another object of the present invention to provide a means for removing lead from "doctor sweet" fractions of petroleum oil containing lead. It is a further object of the present invention to provide a means for removing lead from "doctor sweet" fractions of petroleum oil containing lead and to concurrently regenerate spent alkaline solution which has been used for the extraction of hydrogen sulfide from gaseous or liquid mixtures of hydrocarbons. Other objects and advantages will become apparent from the following description.

Commercial petroleum fractions such as gasoline, kerosene, naphtha, etc. free from hydrogen sulfide, are treated with an aqueous sodium plumbite solution containing about 4 to 24 per cent of an alkali metal hydroxide, usually sodium hydroxide, having a specific gravity of about 6° to 30° Baumé and containing about 1.5 to about 6.0 weight per cent of litharge. The oil and aqueous plumbite solution are agitated in the presence of air and sulfur added during the sweetening to complete the reaction presumed to be represented by the following equations:

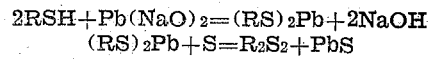

$$2RSH + Pb(NaO)_2 = (RS)_2Pb + 2NaOH$$
$$(RS)_2Pb + S = R_2S_2 + PbS$$

The "sweetened" oil is separated from the aqueous solution, water-washed and blown with air until bright. However, a sediment often is deposited from the "sweetened" oil during customer storage.

The deposition of this sediment from "sweetened" oils can be eliminated by washing the "sweetened" oil after separation from the aqueous plumbite solution with spent aqueous caustic solution which has previously been used to remove hydrogen sulfide from gaseous or liquid hydrocarbons. After contact with lead-containing "sweetened" oil the caustic solution is regenerated and ready for use in the treatment of other oil or gas containing hydrogen sulfide. After washing the "sweetened" oil with spent caustic (containing sulfides of an alkali metal) the washed oil is separated from the regenerated caustic solution, water-washed and blown moisture free in the usual manner. Thus, the present invention provides a means for regenerating partially or completely spent caustic solutions used in the removal of hydrogen sulfide from oil or gas and concurrently eliminating the deposition of a sediment from "doctor sweetened" oils. When necessary, as when partially or completely spent caustic solutions are not available, a solution of an alkali metal sulfide prepared for the purpose may be used.

A satisfactory means for evaluating the stability on storage of a petroleum fraction such as a kerosene or fuel oil is a test, referred to hereinafter as the T. S. L. test for fuel oil stability. The test is performed as follows:

One hundred and fifty milliliters of the oil to be tested is filtered through two thicknesses of filter paper to remove any sediment or foreign matter. The volume of the filtrate is sufficient for duplicate determinations of stability. If it is desired to obtain the value for the original sediment present in the sample, the foregoing filtration should be carried out using a weighed Gooch crucible or the like which is then washed free of the oil with A. S. T. M. naphtha and dried in an oven overnight at a temperature 212°–220° F. to constant weight. The difference in weight of the crucible divided by 1.5 is then reported as milligrams of original sludge per 100 milliliters of oil.

A fifty milliliter portion of the filtered sample is charged to the glass liner of an A. S. T. M. gasoline induction test bomb. The liner is previously cleaned in accordance with the procedure given in A. S. T. M. Designation D525–42T. The bomb is then closed and tightened and oxygen admitted to the bomb until a pressure of 100 pounds per square inch gauge is attained. The bomb is then vented to the atmosphere and the procedure repeated. After venting to the atmosphere a second time the bomb valve is closed and the bomb immersed completely in a steam bath. After remaining in the steam bath for fifteen minutes the bomb is vented again to the atmosphere to ensure that the test is not carried out under pressure. The bomb is then returned to the steam bath and kept in the steam bath for twenty-four hours after which the bomb is removed, cooled and opened.

The contents of the glass liner are filtered through a weighed Gooch crucible. The glass liner is rinsed twice using approximately 10 milliliters of A. S. T. M. naphtha each time to remove any sludge remaining in the liner and the washings also filtered through the weighed Gooch. The Gooch crucible is washed with 50 milliliters of the A. S. T. M. naphtha making certain that all of the oil clinging to the sides of the crucible is washed through the filter bed thereof. The crucible is then dried to constant weight in an oven at 212°–220° F. The difference in weight of the crucible is noted.

The glass liner is washed again with 25 milliliters of A. S. T. M. naphtha and the washings discarded. Thereafter the glass liner is washed with two 25 milliliter portions of chemically pure acetone to dissolve all adhering residue. The acetone washings are then transferred to a weighed Berzelius type beaker and the acetone evaporated using the procedure of A. S. T. M. D381–36. After the acetone has evaporated the beaker is cooled, weighed and the increase in weight noted.

The sum of the increases in the weights of the Gooch crucible and the beaker is multiplied by two and the result reported as milligrams of sludge formed during the test per 100 milliliters of sample. It has been found that oils which in the foregoing test form less than 6 milligrams of sludge per 100 milliliters of oil have satisfactory stability. The stability is reported as a number equivalent to the number of milligrams of sludge formed during the test per 100 milliliters of oil. Thus, an oil in which 6.4 milligrams of sludge is formed per 100 milliliters of oil is said to have a T. S. L. stability of 6.4.

Indicative of the concurrent improvement of a "doctor sweet" kerosene which had been sweetened by the sodium plumbite method and the tendency to form sediment on storage reduced by treatment with an alkaline solution of sodium sulfide is the following:

After plumbite sweetening to a negative "doctor test," washing and blowing to remove moisture, a kerosene had a T. S. L. stability of 6.4. After washing the sweetened oil with a solution containing 3.86 weight per cent sodium hydroxide, 6.3 weight per cent sodium sulfide and 4.0 volume per cent organic acids (spent caustic from hydrogen sulfide extraction), the kerosene had a T. S. L. stability of 3.6. The regenerated caustic solution was ready for use in extracting further amounts of hydrogen sulfide.

I claim:
1. A method of stabilizing a doctor sweetened mixture of hydrocarbons which comprises establishing a body of aqueous alkaline solution which has been used to extract hydrogen sulfide from a mixture of hydrocarbons, establishing a body of unstable, doctor sweetened hydrocarbons containing lead, contacting said body of aqueous alkaline solution with said body of unstable, doctor sweetened hydrocarbons until said body of doctor sweetened hydrocarbons is stabilized and said aqueous solution is regenerated, and separating said body of stabilized, doctor sweetened hydrocarbons from said regenerated aqueous alkaline solution.

2. A method of stabilizing a doctor sweetened mixture of hydrocarbons and concomitantly regenerating an aqueous alkaline solution which has been used to extract hydrogen sulfide from a mixture of hydrocarbons, which comprises establishing a body of aqueous alkaline solution which has been used to extract hydrogen sulfide from a mixture of hydrocarbons, establishing a body of unstable, doctor sweetened hydrocarbons containing lead, contacting said body of aqueous alkaline solution with said body of unstable doctor sweetened hydrocarbons until said body of doctor sweetened hydrocarbons is stabilized and said aqueous alkaline solution is at least partially regenerated, separating said body of stabilized, doctor sweetened hydrocarbons from said body of at least partially regenerated aqueous alkaline solution, and contacting a mixture of hydrocarbons containing hydrogen sulfide with said body of at least partially regenerated aqueous alkaline solution.

3. A method of stabilizing a doctor sweetened mixture of hydrocarbons and concomitantly regenerating an aqueous alkaline solution which has been used to extract hydrogen sulfide from a mixture of hydrocarbons contaminated therewith which comprises establishing a body of aqueous alkaline solution which has been used to extract hydrogen sulfide from a mixture of hydrocarbons, establishing a body of unstable, doctor sweetened hydrocarbons containing lead, contacting said body of aqueous alkaline solution with said body of unstable, doctor sweetened hydrocarbons until said body of doctor sweetened hydrocarbons is stabilized, separating said stabilized body of doctor sweetened hydrocarbons from said body of aqueous alkaline solution, continuing to successively contact said body of aqueous alkaline solution with an unstable, doctor sweetened mixture of hydrocarbons and separate a stabilized, doctor sweetened mixture of hydrocarbons therefrom until said aqueous solution is regenerated, and contacting a mixture of hydrocarbons containing hydrogen sulfide with said regenerated aqueous alkaline solution.

JOHN BORDEN STRIPLING.

REFERENCES CITED

The following references are of record in the file of this patent:

UNITED STATES PATENTS

| Number | Name | Date |
|---|---|---|
| 1,718,714 | Link et al. | June 25, 1929 |
| 1,949,756 | Morrell | Mar. 6, 1934 |
| 2,218,610 | Hewlett | Oct. 22, 1940 |
| 2,394,662 | Camp et al. | Feb. 12, 1946 |
| 2,431,770 | Payne et al. | Dec. 2, 1947 |
| 2,437,348 | Brown et al. | Mar. 9, 1948 |